United States Patent
Rubinstein et al.

(10) Patent No.: US 11,483,169 B2
(45) Date of Patent: *Oct. 25, 2022

(54) AUTOMATED MESSAGE RECIPIENT IDENTIFICATION WITH DYNAMIC TAG

(71) Applicant: MICROSOFT TECHNOLOGY LICENSING, LLC, Redmond, WA (US)

(72) Inventors: Mark Ian Rubinstein, Bellevue, WA (US); Amit Akiva Apple, Redmond, WA (US); Thaddeus Scott, Kirkland, WA (US); Meng Yao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,354

(22) Filed: Nov. 29, 2021

(65) Prior Publication Data
US 2022/0086015 A1    Mar. 17, 2022

Related U.S. Application Data

(63) Continuation of application No. 16/460,991, filed on Jul. 2, 2019, now Pat. No. 11,190,366.

(51) Int. Cl.
*H04L 12/18* (2006.01)

(52) U.S. Cl.
CPC .................................. *H04L 12/18* (2013.01)

(58) Field of Classification Search
CPC ........ H04L 12/18; G06Q 50/01; G06Q 51/14; G06Q 51/08; G06Q 30/02; G06Q 30/0269; G06Q 30/0264; G06Q 30/0271; G06Q 30/0261
See application file for complete search history.

(56) References Cited

U.S. PATENT DOCUMENTS

| | | | | |
|---|---|---|---|---|
| 8,190,692 B1 * | 5/2012 | Zilka | ...................... | H04W 4/02 709/204 |
| 8,275,399 B2 * | 9/2012 | Karmarkar | .............. | H04L 67/52 455/403 |
| 8,516,058 B2 * | 8/2013 | Stern | ..................... | H04L 51/063 709/206 |
| 8,589,433 B2 * | 11/2013 | Gawor | .................. | G06F 16/353 706/14 |
| 8,924,447 B2 * | 12/2014 | Babin | ..................... | G06F 7/544 708/204 |

(Continued)

*Primary Examiner* — Sargon N Nano
(74) *Attorney, Agent, or Firm* — NovoTechIP International PLLC

(57) ABSTRACT

In a communication device including a processor and a computer-readable medium, the computer-readable medium includes instructions for performing receiving a text input composing a message, the text input including a word characterizing a recipient group; transmitting the text input to a server; receiving, from the server, feedback data indicating that the recipient group for the message has been identified; in response to receiving the feedback data, providing an indication that the recipient group for the message has been identified; receiving a user input requesting to send the message to the identified recipient group; and in response to receiving the user input, transmitting, to the server, a request to send the message to the identified recipient group.

20 Claims, 9 Drawing Sheets

(56) References Cited

U.S. PATENT DOCUMENTS

| | | | |
|---|---|---|---|
| 9,264,392 B2* | 2/2016 | Garcia | G06F 16/487 |
| 2011/0113349 A1* | 5/2011 | Kiciman | G06F 16/30 |
| | | | 715/753 |
| 2012/0079045 A1* | 3/2012 | Plotkin | H04M 1/7243 |
| | | | 709/206 |
| 2013/0054718 A1* | 2/2013 | Davies | H04L 12/6418 |
| | | | 709/206 |
| 2013/0055300 A1* | 2/2013 | Hanina | G06Q 50/01 |
| | | | 725/10 |
| 2014/0123237 A1* | 5/2014 | Gaudet | H04L 63/101 |
| | | | 726/4 |
| 2014/0172988 A1* | 6/2014 | Baldwin | H04L 51/212 |
| | | | 709/206 |
| 2016/0112359 A1* | 4/2016 | Allen | H04L 51/214 |
| | | | 709/206 |

* cited by examiner

Choose who can add tags and which tags are automatically applied

Who can add tags

[ Owners only ⌄ ]

Automatically apply tags from company directory and other apps

Company directory
- ◯ Title
- ◯ Company
- ◯ Office
- ◯ City
- ◯ State
- ◯ Country
- ◯ Department Apps
- ◯ Shifts

FIG. 2

Members (1311)

| Name | Title | Location | Tags ⓘ |
|---|---|---|---|
| Alvin Tao | Customer Service | Bellevue /1251 | Customer Service |
| Babak Shamas | Store Manager | Bellevue /1251 | Buyer |
| Beth Davis | Sales Associate | Bellevue /1251 | Cashier \| Sales Associate |
| Bruno Zhao | Executive | Bellevue /1251 | Executive |
| Brian Wright | Store Manager | Bellevue /1251 | Cashier \| Sales Associate |
| Cassandra Dunn | Sales Associate | Bellevue /1251 | Cashier \| Sales Associate |
| Charlotte de Krum | Sales Associate | Bellevue /1251 | Sales Associate |
| Chris Naidoo | Cashier | Bellevue /1251 | Cashier |
| Danielle Booker | Sales Associate | Bellevue /1251 | Cashier \| Sales Associate |

FIG. 5

AUTOMATED MESSAGE RECIPIENT IDENTIFICATION WITH DYNAMIC TAG

CROSS-REFERENCE TO RELATED APPLICATIONS

This application is a continuation of co-pending U.S. patent application Ser. No. 16/460,991, titled "AUTOMATED MESSAGE RECIPIENT IDENTIFICATION WITH DYNAMIC TAG," filed on Jul. 2, 2019, which is related to co-pending U.S. patent application Ser. No. 16/460,999, titled "RESOURCE ACCESS CONTROL WITH DYNAMIC TAG," filed concurrently on Jul. 2, 2019, which are incorporated hereto in their entirety.

BACKGROUND

There are numerous ways for a person to send a message to another person. For example, using a mobile phone, one can call another person, send an email or text message to another person, post a message on an online chatroom or bulletin board where other people can read and post messages, etc. Also, a large number of people use social networking services (e.g., Facebook, Instagram, LinkedIn, etc.) to communicate with others, which allow a user to tag a person to a post to ensure that the message is seen by the tagged person. While these services allow people to instantly communicate with each other, in order to send a message to someone, one is required to know to whom his or her message should be delivered to before the message is sent out. For example, there might be a situation where a research engineer located at Detroit may need to send a message to someone within the same company who can provide information about Asian marketing. Not knowing whom to contact for his inquiry, the research engineer would need to search the company directory or make phone calls to people who might be able to provide necessary information (e.g., a name, mobile number, email address, etc.), which may be time-consuming and may not always result in providing accurate information. The research engineer would not be able to send a message until he or she accurately identifies a person or a group of people in the Asian marketing department and obtains contact information that he or she can rely on to successfully send a message. Such delay caused by these activities may be crucial especially in healthcare, law enforcement, education, crisis management, etc. As such, there still remain significant areas for new and improved implementations for streamlined message target identification and delivery.

SUMMARY

In an implementation, a communication device includes a processor and a computer-readable medium in communication with the processor. The computer-readable medium includes executable instructions that, when executed by the processor, cause the processor to control the communication device to perform functions of receiving, via a message user interface of the communication device, a text input composing a message, the text input including a word characterizing a recipient group for the message; transmitting the text input to a server via a communication network; receiving, from the server via the communication, feedback data indicating that the recipient group for the message has been identified based on the word included in the text input; in response to receiving the feedback data, providing, via the message user interface, an indication that the recipient group for the message has been identified based on the word included in the text input; receiving, via the message user interface, a user input requesting to send the message to the identified recipient group; and in response to receiving the user input, transmitting, to the server via the communication network, a request to send the message to the identified recipient group.

In another implementation, a method performed by a communication device includes receiving, via a message user interface of the communication device, a text input composing a message, the text input including a word characterizing a recipient group for the message; transmitting the text input to a server via a communication network; receiving, from the server via the communication, feedback data indicating that the recipient group for the message has been identified based on the word included in the text input; in response to receiving the feedback data, providing, via the message user interface, an indication that the recipient group for the message has been identified based on the word included in the text input; receiving, via the message user interface, a user input requesting to send the message to the identified recipient group; and in response to receiving the user input, transmitting, to the server via the communication network, a request to send the message to the identified recipient group.

In another implementation, a non-transitory computer-readable medium includes instructions that, when executed by a processor, cause the processor to control a communication device to perform functions of receiving, via a message user interface of the communication device, a text input composing a message, the text input including a word characterizing a recipient group for the message; transmitting the text input to a server via a communication network; receiving, from the server via the communication, feedback data indicating that the recipient group for the message has been identified based on the word included in the text input; in response to receiving the feedback data, providing, via the message user interface, an indication that the recipient group for the message has been identified based on the word included in the text input; receiving, via the message user interface, a user input requesting to send the message to the identified recipient group; and in response to receiving the user input, transmitting, to the server via the communication network, a request to send the message to the identified recipient group.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates an implementation of a user interface for configurating settings for the automated message recipient identification system.

FIG. 5 illustrates an implementation of a user interface showing one or more tags pre-generated and associated with members.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to an automated message recipient identification system, which allows a message sender to use a tag to characterize to whom his or her message should be sent. Based on the tags, the system handles a task of identifying message recipients on behalf of the message sender. The system may be connected to various data source devices that can provide various types of data sets regarding members. The data source devices may be operating to collect, maintain and update different types of member data and may provide the most accurate and up-to-date member data. By leveraging the detailed, accurate and up-to-date member data available from the various data sources, the system may allow the message sender to characterize, using one or more tags, a recipient or recipient group for his or her message in a high level of detail. Based on the tags, the system may take care of the burden of identifying the recipient or recipient group for the message on behalf of the message sender by processing the various data sets to identify the members who are relevant to the tags. Hence, a message sender can send a message immediately without needing to search or ask around about to which people he or she needs to send the message and how to contact those people. Since a message sender can send a message even if he or she does not know the recipient identity or contact information, the system may provide a technical advantage of reducing or eliminating a delay in sending a message caused by searching or asking around about the people. The system may subscribe various data sources in a flexible manner. For example, when a new data source becomes available, the system may connect to the new source to start subscribing to a new data set. When a data source cannot provide accurate or up-to-date message recipients, the system may stop subscribing to the data source. As such, the system may identify a message recipient or recipient group in a more accurate manner, which may also reduce or eliminate a likelihood of a message being sent to an unintended member or member group.

Figure 1:
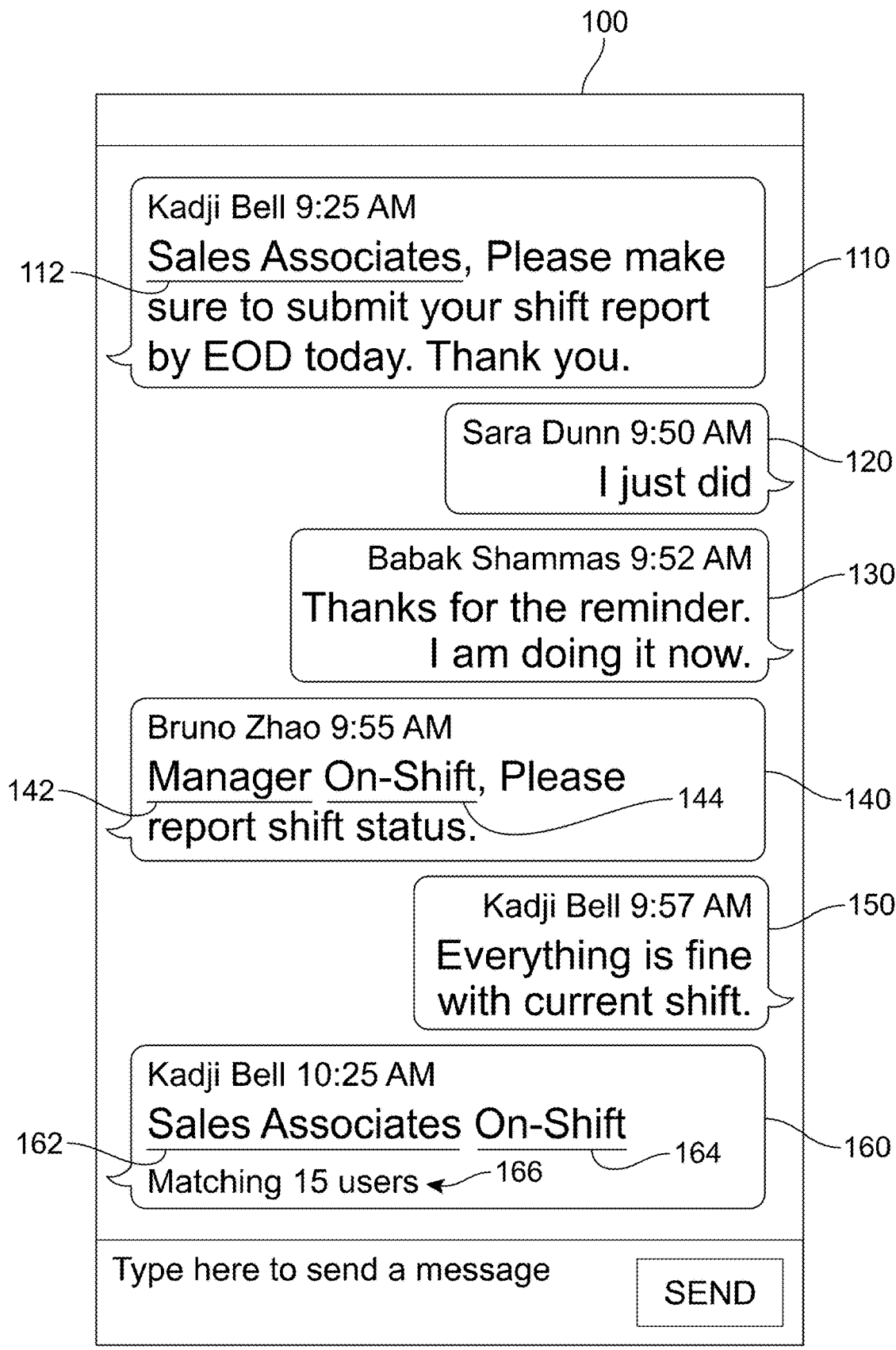
FIG. 1 illustrates an implementation of a user interface for a messaging app in communication with an automated message recipient identification system.

FIG. 1 illustrates an implementation of a user interface 100 for a messaging application (e.g., a mobile messaging app) operating on a user device (e.g., a mobile phone) associated with a user, for example, Kadji Bell, a manger of XYZ department store and is on the current shift. The user device may be in communication with a messaging application server which may be implemented with the automated message recipient identification system (hereinafter "system") to operate the messaging application. The system may allow Kadji to send a message using one or more dynamic tags that characterize the recipients for the message, which may eliminate a need for Kadji to know the identity of the message recipients prior to sending the message. For example, when Kadji needs to send a message to sales associates of XYZ depat intent store, he may not need to find out who are working as sale associates in XYZ department store and then open a chatroom and invite all the sales associates to the chat room. Instead, Kadji may create and send a message 110 that includes a "Sales Associates" tag 112 which characterizes the recipients of the message 110.

To determine the recipients characterized by the tag, the system may internally store one or more of member or employee data sets of different types (e.g., directory data, personnel data, schedule data, location data, etc.), or receive one or more member data sets from one or more external data source devices (e.g., a directory server, personnel data server, member schedule data server, member location server, etc.). The system may connect to a new external data source device or disconnect from an existing data source device in a flexible manner. For example, when a new data source device becomes available, the system may connect to the new data source device to subscribe a new type of member data set. When an existing data source device malfunctions or cannot provide accurate or up-to-date member data, the system may disconnect from the data source device.

The system may be configured to aggregate a member data set from an external data source device. For example, upon connecting to a member directory server, the system may receive the current member directory data from the member directory server. The received member directory data may be stored in an internal or external data storage. When there is a change or update to the member directory data (e.g., new hire, promotion, retirement, resignation, etc.), the directory server would be one of the first things to be updated in an organization. The directory server may then send such update to the system, which may in turn update the stored member directory data. By aggregating member data from various data source devices, the system may be able to more promptly and accurately identify message recipients without needing to collect member data from members or management personnel (e.g., a member directory management personnel). This may also eliminate a need to operate two different data management systems for the same data type. For example, by connecting and subscribing to the member directory server and aggregating the member directory data from the member directory server, the system may be not required to separately collect, manage, and update the member directory data, which is carried out by the member directory server. Also, the system may receive update data from the member directory server immediately after the member directory server is updated with new data, which may solve the technical problem of inaccurately identifying message recipients based on outdated and inaccurate member directory data when the member directory server provides an update periodically, for example, once a week or month.

Referring to FIG. 1, upon receiving the message 110 including the tag 112, the system may determine whether the tag is relevant to a specific data set or type, such as, member (or employee) directory data, member personnel data, member schedule data, member location data, etc. Once the relevant data set or type is determined, the system may search, in the data storage, a member data set corresponding to the relevant data type. For example, upon determining that that the "Sales Associates" tag 112 is an employee title, the system may determine that the tag 112 is relevant to the employee directory data, which may include, for example, an employee name, employee ID, department, title, role, assignment, supervisor, etc. The system may then search the employee directory data aggregated in the data storage and identify employees that are relevant to the "Sales Associates" tag 112. The system may then retrieve, from the data storage, the employee IDs, network login IDs or messaging app alias, etc. that the system can understand and translate to the target recipients for the message 110.

Alternatively, the system may send, to the employee directory server, a request to search and identify employees that match the "Sales Associates" tag 112. The employee directory server, which may operate independently from the system, may then search its database and sends identity data of the target recipients. For example, the employee directory server may send the employee IDs, network login IDs or messaging app alias, etc. that the system can understand and translate to the target recipients for the message 110.

The system may internally collect, manage and update various member data to operate independently without relying on an external data source device. For example, the system may communicate with user devices to request and receive geolocations (e.g., GPS coordinates) of the user devices. The system may also communicate with user devices to request and receive various member data (e.g., a name, title, department, team, supervisor, office location, etc.) from each user. The received member data may be stored in a data storage and managed using a database. An operator or administrator may then create a plurality of tags to utilize the stored member data. For example, an operator may remotely access the system using his or her computer. After reviewing available member data, such as a title, department, team, office location, etc., the operator may create a plurality of tags, such as, associate, manager, executive, intern, sales, marketing, security, human resource, inventory management, transportation, main lobby, first floor, second floor, etc.

Upon receiving the identity data of the target recipients from the external data source device, the system may send the message 110 to the target recipients, for example, the employees whose title is registered as "sales associates" in the employee directory server. The system may then receive responses, such as responses 120 and 130 from the sales associates, for example, Sara Dunn and Babak Shammas, and relay the received responses 120 and 130 to Kadji's user device. As such, by using the tag 112 characterizing the recipients, Kadji may send the message 110 without needing to know or search who the sales associates are and what their messaging app alias are, which may enhance and speed up the communication among the employees.

The system may be configured to allow the users to use more than one tag to characterize target recipients. For example, the system may receive a message 140 from Bruno Zhao, the CEO of XYZ department store. The message 140 may include two tags: a "Manager" tag 142 and "On-Shift" tag 144. The system may then determine one or more member data sets relevant to the tags 142 and 144. For example, the "Manger" tag 142 may be relevant to the directory data (e.g., employee directory data) aggregated and stored in the data storage, but the "On-Shift" tag 144 may not be relevant to the directory data. Instead, the "On-Shift" tag 144 may be relevant to member schedule data, such as employee shift data. The employee shift data may include a shift type (e.g., a morning shift, even shift, weekend shift, etc.), shift members, shift team manager, etc. The shift management server may operate in connection with an employee schedule server, which allows a member to add, move or delete a meeting, appointment, due date, shift data, etc. to a member's digital calendar. The system may receive an update from the shift management server when there is a change or update to the employee shift data managed by the shift management server. Alternatively, the system may send a request to the employee directory server for identity data of the employees relevant to the "Manger" tag 142. The system may also send another request to the shift management server for identity data of the employees relevant to the "On-Shift" tag 144.

The tags may be dynamic in a sense that the target recipients relevant to the tags may be different at different times or locations. For example, when there are two shift teams for day and night shifts, the target recipients relevant to the "On-Shift" tag 144 for a message sent during the day shift is completely different from the target recipients for a message sent during the night shift. Similarly, when the XYZ department store operates in two different locations, the target recipients relevant to the "On-Shift" tag 144 at one location may be completely different from the target recipient at the other location.

Upon searching the data storage or sending requests to external data source devices, the system may obtain identity data about all the mangers of XYZ department store and all the employees who are on the current shift. The system may then determine an employee or employees found in both identity data pieces as the target message recipients. For example, Kadji, who is the manager and is on the current shift, would be found in both identity data pieces received from the employee directory server and shift management server. Hence, the system may determine Kadji as one of the target recipients, if not the only, for the message 140 sent by Bruno. The system may then send the message 140 to Kadji's user device and, in return, receive Kadji's response massage 150, which is then relayed to Bruno's user device. As such, when two or more tags are associated with a message, the system may be able to more accurately determine the recipients for the message. Also, by connecting or subscribing to more external data source devices, the system may allow to use more tags to characterize recipients in a more detailed and accurate manner.

The system may connect or subscribe to a new external data source device by arranging the new external data source device to initially send the current member data to the system and then send an update when there is a change or update to the member data managed by the external data source device. Alternatively, the system may connect or subscribe to a new external data source device by granting an access a data storage or database operated by the data source or allowing the system to send a database search inquiry to the data source. For example, the system may be configured to send an inquiry to the employee directory server when a tag indicating a title, department, office location, etc. The employee directory server may be configured to recognize and authorize the inquiry from the system based on an IP address or security credential (e.g., access ID and password) of the system.

The system may also temporarily or permanently disconnect from or stop subscribing to an external data source device when it is determined that the particular external data source device is malfunctioning. For example, the system may receive feedback from those who have received messages that they are not the intended recipient for the message. The system may then track from which external data source device the target recipient data has originated. When it is determined that an external data source device has provided inaccurate target recipient data, the system may disconnect from the data source device by stop receiving an update or stop sending a request to identify target recipients for a message.

The system may be configured to provide additional tag-related services. For example, the system may be configured to automatically apply one or more tags to members based on various member data received from the external data source devices. Alternatively, the system may be configured to allow an authorized person to associate one or more tags to each member. FIG. 2 shows an implementation of a graphical user interface for configuring the system, from which various configuration setting may be adjusted, such as who can add tags (e.g., owners only, everyone, etc.), which types of member data can be used as a tag (e.g., a title, company, office, city, state, country and department), which external data source devices the member data can be received from to generate and apply tags (e.g., a member directory server, personnel data server, shift management server, etc.), etc. By adjusting the settings, the system may operate to, for example, generate tags based only on the title and department of the members, or create time-related tags based on the data received from the shift management server, which may host a shift app.

The system may be configured to provide data related to a tag. For example, referring to FIG. 1, when Kadji enters a word or words, such as a "Sales Associates" tag 162 and "On-Shift" tag 164, the system may determine whether the entered word or words are relevant to the available member data types, and determine identity data of the message recipients from each relevant data types aggregated and stored in the data storage. The system may then provide an indication as to whether the tag or tags are available for selection by Kadji. For example, the system may cause Kadji's device to change the appearance of the tags 162 and 164, such as adding an underline or changing a font color of the tag, to indicate that the tags 162 and 164 entered by Kadji are available for selection and usable for characterizing the message 160. The system may convert the tags to a linked text (e.g., a hypertext, etc.), which is linked to another graphical user interface or data page displaying a list of the recipients corresponding to the tags 162 and 164. The system may also provide data related to the target recipients of the tags 162 and 164. For example, as shown in FIG. 1, the system may cause Kadji's device to display a system message 166 indicating a number of the target recipients for the tags 162 and 164 as shown in FIG. 1, or a list of the target recipients.

Figure 3:
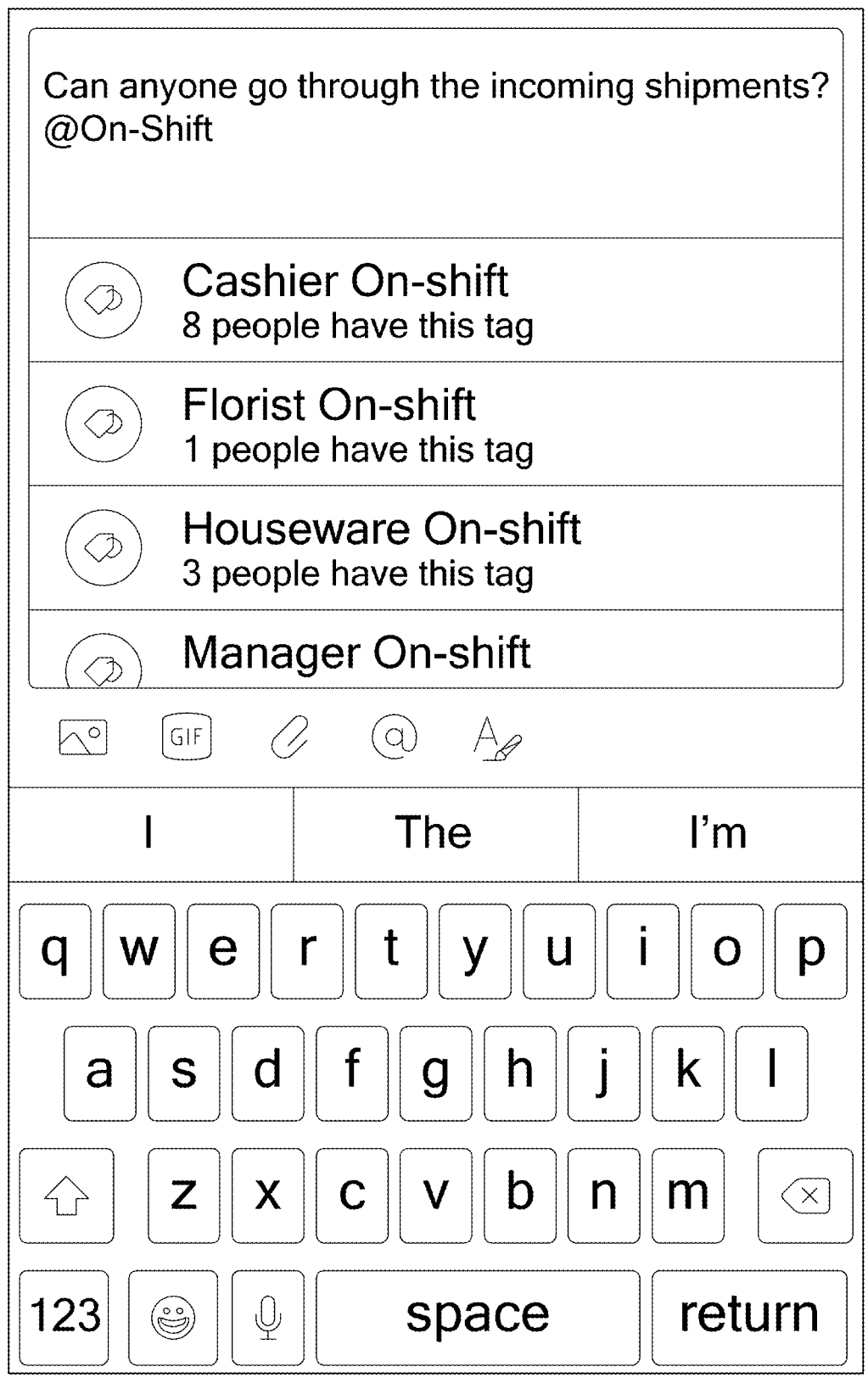
FIG. 3 illustrates an implementation of a user interface for a messaging app for displaying a list of tags relevant to a tag entered by a user.

The system may be configured to automatically complete or help a user find a tag when a user enters a letters, number or symbol. For example, the system may store, in a data storage, a number of tags that are relevant to the external data source devices available to the system. When Kadji enters a letter "s," the system may search the data storage to identify tags that starts with the letter "s," such as, Sales Department, Sales Manager, Sales Associates, Sales Director, Summer Intern, Safety Officer, etc. The system may then cause Kadji's device to display the identified tags for selection by Kadji. Another example is shown in FIG. 3, which illustrates a graphical user interface for a mobile messaging app operating in connection with the system. When the user enters a message and add a tag "@On-Shift," the user device may send the tag to the system, which may, in turn, generate and send, to the user device, a list of tags containing "On-Shift," such as, "Cashier On-Shift," "Florist On-Shift," "Houseware On-Shift," "Manager On-Shift," etc. The received list of tags may be displayed via the user interface for selection by the user.

Figure 4A:
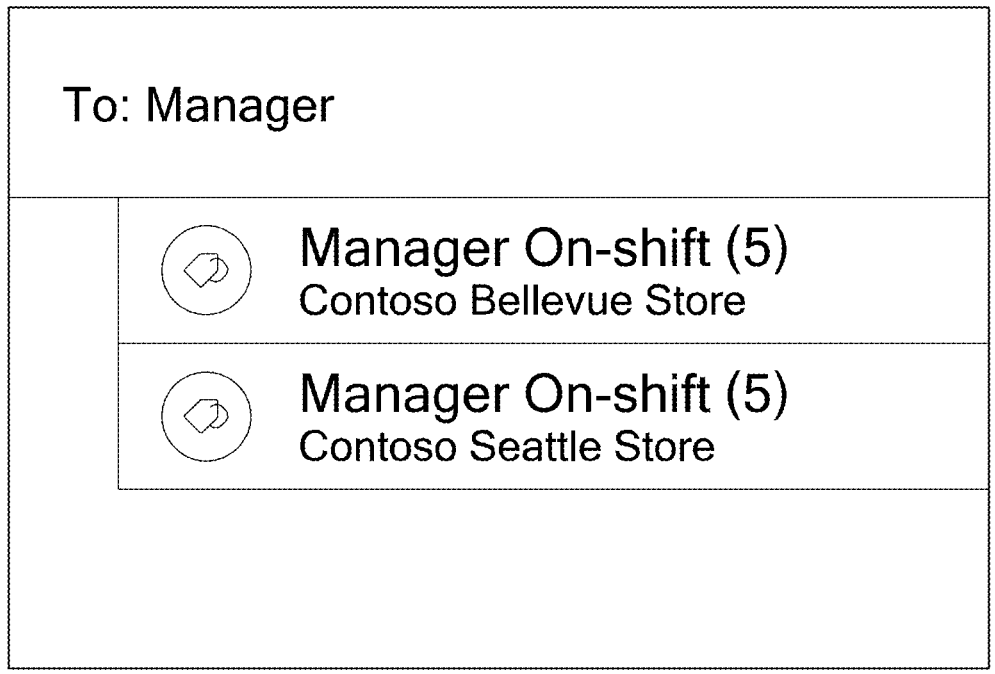
FIGS. 4A to 4D illustrate an implementation of a user interface to convert a user input to a tag and translating the tag to member contact data.
Figure 4B:
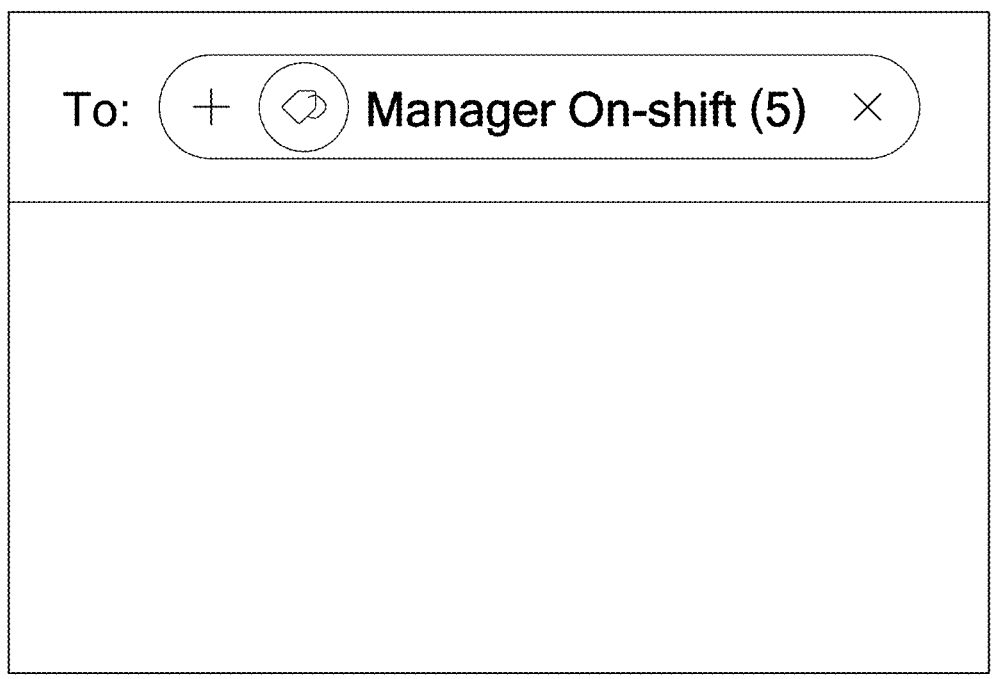
Figure 4C:
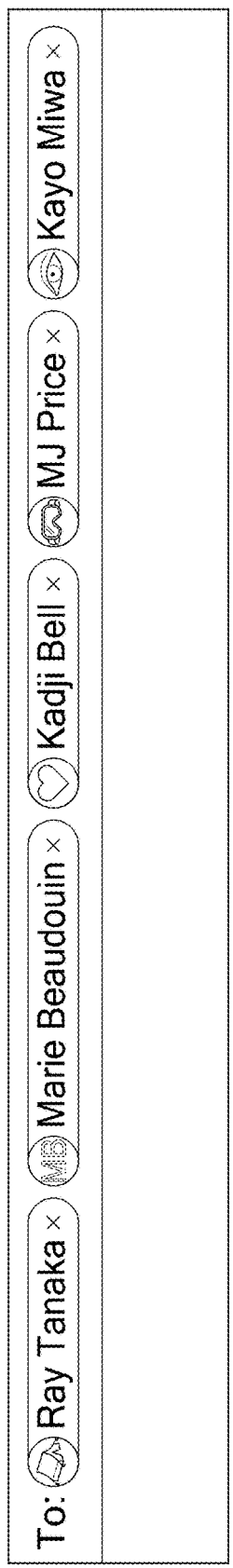
Figure 4D:
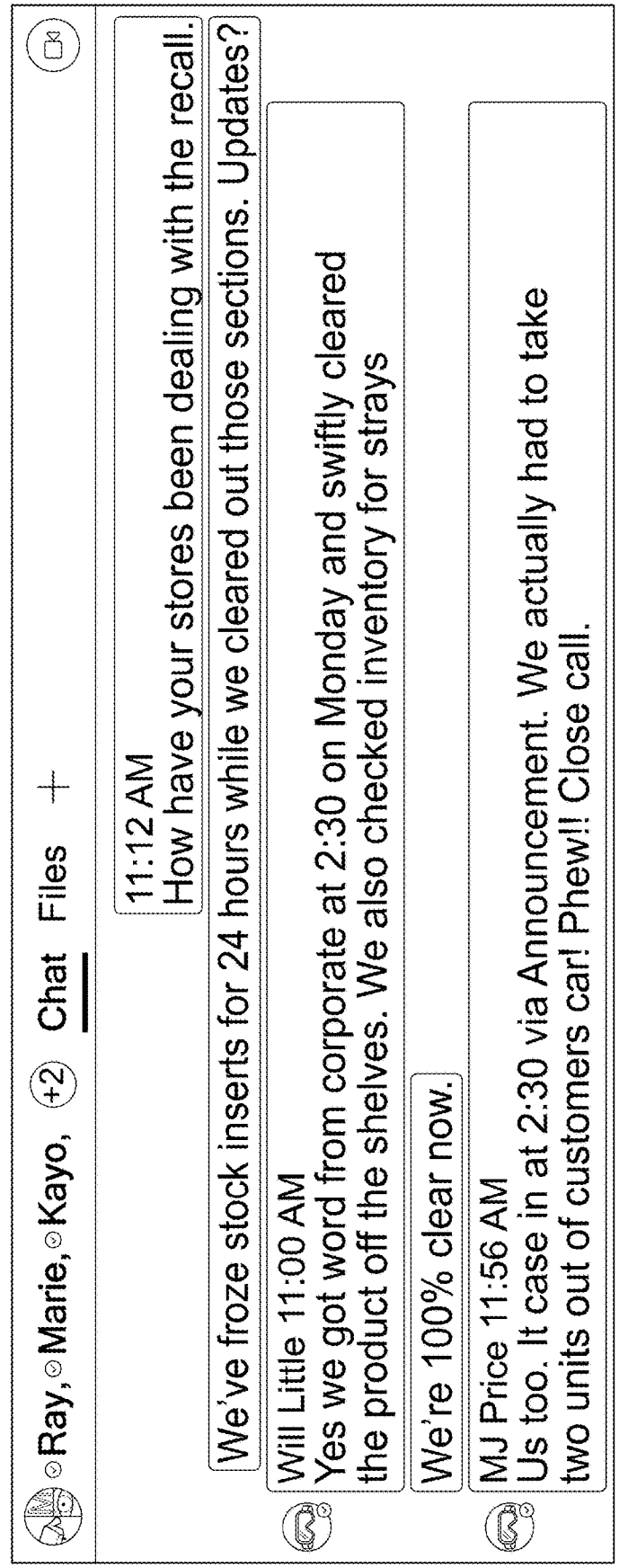

FIGS. 4A to 4D illustrate an implementation of how a word entered by a user is recognized as a tag by the system, and then translated to the actual members. In FIG. 4A, the user enters a word "Manager" in a search window of the messaging app. Upon receiving the word, the system may provide a list of available tags (e.g., Manger On-Shift at Bellevue Store and Manger On-Shift at Seattle Store) that are relevant to the entered word. When one of the list tags is selected by the user, the messaging application may ask the user to confirm whether the user wishes to start a messaging session with the users associated with the selected tag, which is shown in FIG. 4B. Upon receiving the confirmation, the system may transform the tag to the actual contact data that are used to invite the members associated with the tag to the messaging session. The system may also provide an avatar and name of each member associated with the selected tag, which may be displayed via the messaging app, as shown in FIG. 4C. Then, as shown in FIG. 4D, the members are invited to the messaging session. As such, the system may be able to transform a tag to member contact data, which may eliminate the process of searching and selecting members to invite the members to a messaging session.

The system may be configured to pre-generate one or more tags for each member when relevant member data becomes available or automatically update one or more tags associated with a member when an update is received from an external data source device. For example, as shown in FIG. 5, the system may generate one or more tags for each employee based on the employee directory data. The system may operate a data base, which may be stored in the data storage, to store the generated tag or tags associated with each member. Since each member is already associated with one or more tags, the system may be able to identify target recipients more quickly. The system may be configured to update one or more tags associated with each when an update is received from one or more external data source devices. For example, when an update indicating a personnel change between the shifts is received from the shift management server, the system may automatically update a shift related tag to reflect the updated shift data.

1 illustrates an implementation of an automated message recipient identification system 600 (hereinafter referred to as "system 600") connected to a plurality of user devices 610A, 610B, 610C and 610D (referred to as "user devices 610" hereinafter) and a plurality of external data source devices 630A, 630B, 630C and 630D (referred to as "sources 630" or "source devices 630" hereinafter) via a network 640. The system 600 may include a computing device with communication capabilities. For example, the system 600 may be a server hosting a messaging service (e.g., messaging server) and implementing automated message recipient identification scheme to identify recipients for messages sent by organization members, communication service subscribers, government officials, etc. The system 600 may include or has access to a data storage 602, which may store various types of member data received and aggregated from one or more sources, a plurality of tags that are relevant to the member data handled by the sources 630, etc. The user devices 610A, 610B, 610C and 610D may be associated with a plurality of users 620A, 620B, 620C and 620D (referred to as "users 620" hereinafter), respectively. The user devices 610 may be any stationary or mobile computing device with communication capabilities. The users 620 may be members of an organization. Alternatively, the users 620 may not be a member of the same organization. For example, the user 620A may be a potential customer who wants to send a message to a marketing personnel of a company. The user devices 610 may operate a messaging app for the messaging service hosted by the messaging service server 600. The users 620 may use the messaging app to send or receive messages with other users. An implementation of a user interface for the messaging app is shown in FIG. 1.

The sources 630 may provide different types of member data. For example, the sources 630A, 630B, 630C and 630D may provide member directory data, member personnel data, member schedule data, member location data, respectively. Each source 630 may include a computing device operating a database to manage specific data and having communication capabilities. For example, the sources 630A, 630B, 630C and 630D may be a directory server, personnel data server, member schedule server and member location server, respectively. The directory server 630A may collect, store and update general member data, such as a username, title, department, team, supervisor, phone number, email address, office location, etc. The personnel data server 630B may collect, store and update more specific member data, such as, a member's specialty, training records, experiences, prior assignments, language capabilities, licenses, achievements, connections, etc. The member schedule server 630C may collect, store and update a member's shift, vacations, appointments, meetings, attendance/absence status, etc. The member location server 630D may be in communication with the user devices 610 to receive current geographical locations of the users 620 and configured to provide location data of the users 620 when requested by the server 600. The accurate member location data may be crucial in an emergency situation, such as, a fire or shooting breaks out and the nearby members need to be informed.

By connecting or subscribing to the sources 630, the server 600 may be able to receive an update from the sources when there is a change or update to the member data collected and managed by each source 630. By connecting or subscribing to various sources, more dynamic tags can be used to more accurately characterize the target recipients for a message. The server 600 may be operated to internally manage some or all of the source data. For example, the server 600 may manage the directory data while relying on the member location server 630D for current locations of the members. When a new data source device become available, the server 600 may connect to the new service to subscribe a new data set from the new data source device. When an existing source cannot provide accurate and up-to-date member data set, the server 600 would incorrectly identify a recipient group for a message and the message may be sent to a member who is not an intended recipient for the message. When this occurs, the server 600 may receive feedback from a message recipient that the message is not tended for him or her. When a rate of the message being sent to wrong recipients reaches a predetermined threshold, it may be assumed that the source cannot provide accurate and up-to-date member data set. The server 600 may then unsubscribe from the data source by disconnecting form the data source and deleting the data set received from the data source such that the particular data set is no longer used to identify message recipients.

Figure 6:
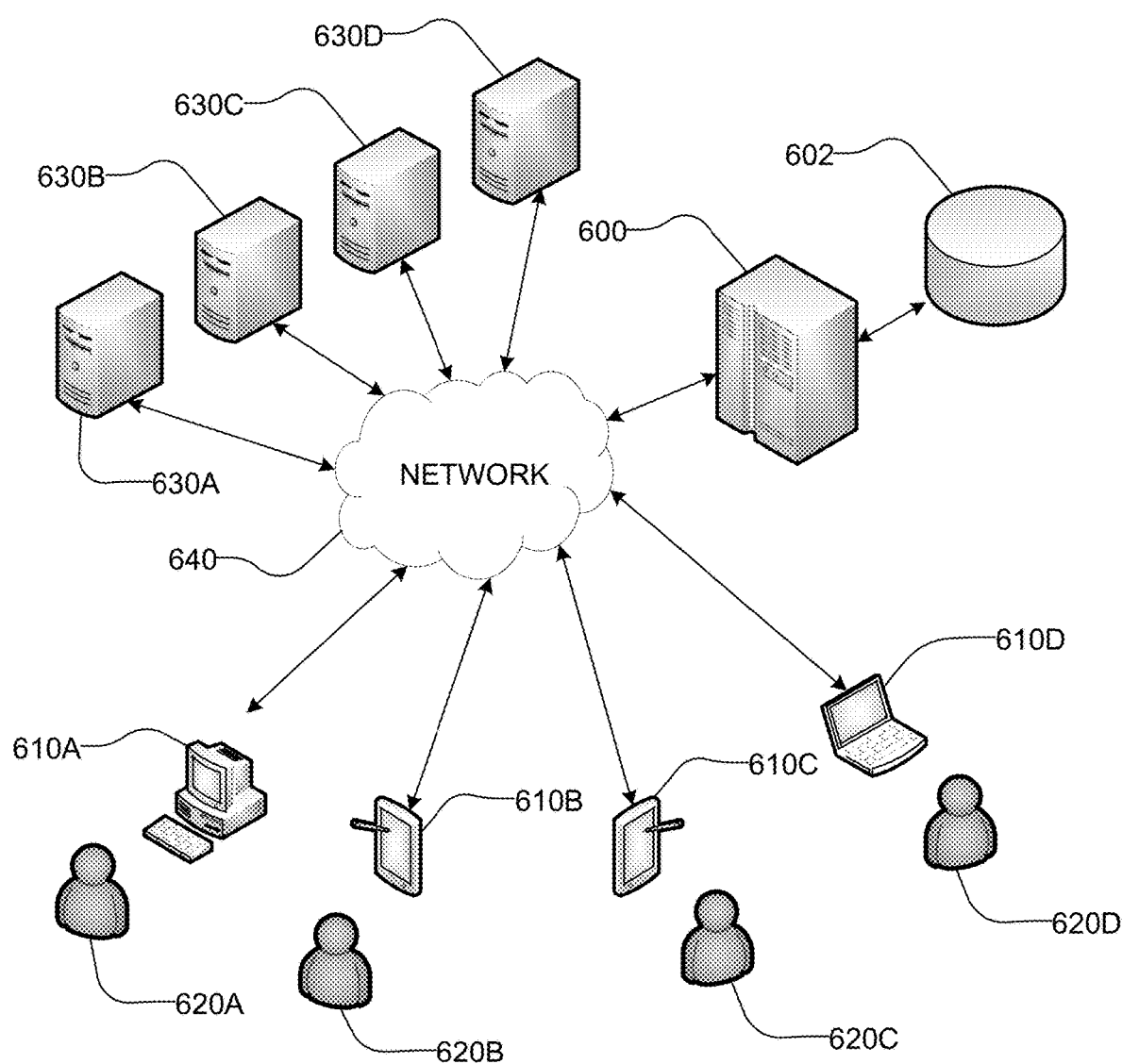
FIG. 6 illustrates the automated message recipient identification system connected to a plurality of user devices and data source devices via a network.
Figure 7:
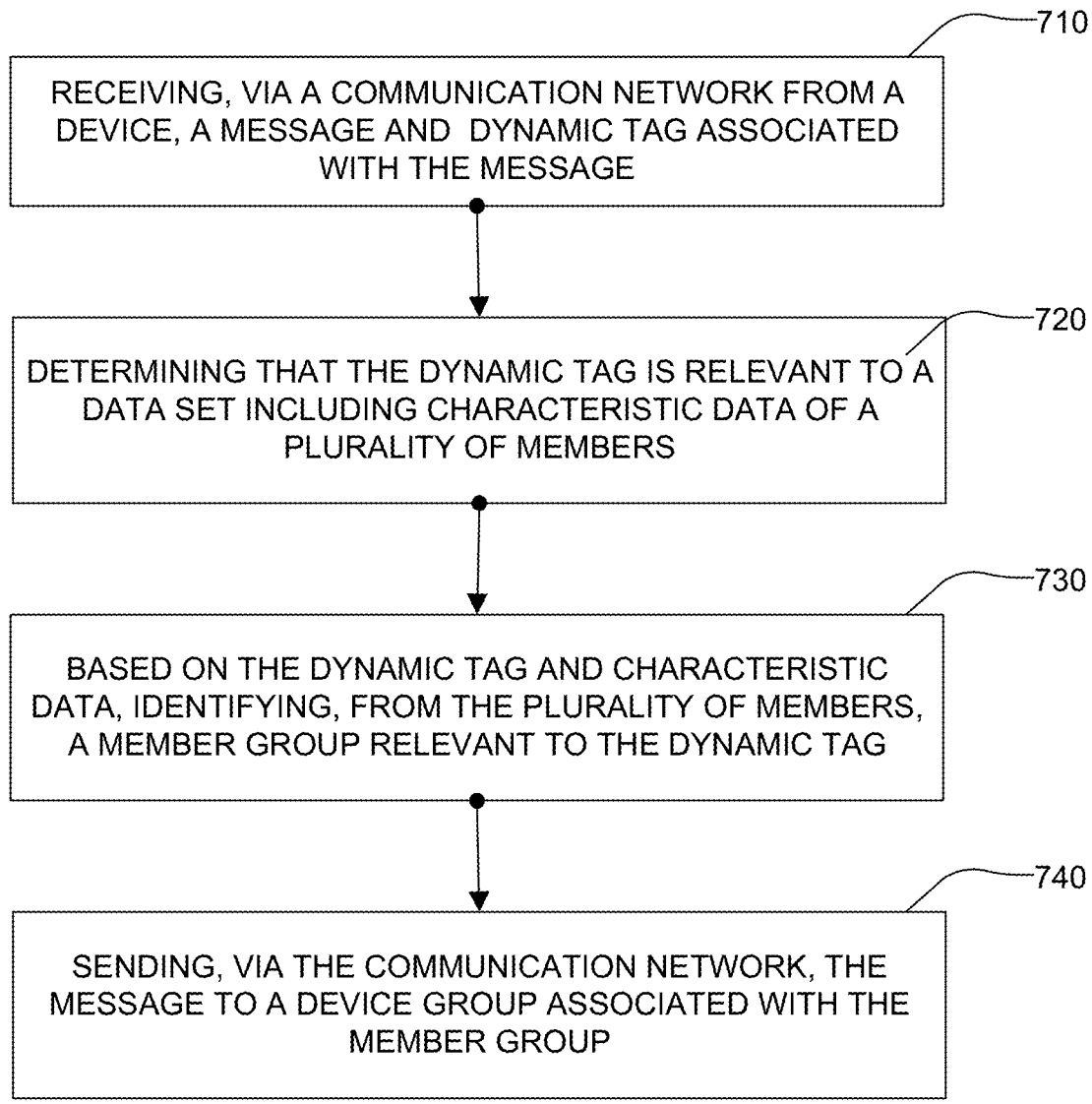
FIG. 7 illustrates a flow diagram showing an implementation of a method of operating the automated message recipient identification system.

FIG. 7 illustrates a flow diagram showing an implementation of a method of operating an automated message recipient identification system. The method is described below with reference to various elements shown in FIG. 6. At step 710, the system or server 600 may receive, via the communication network 640 from the first user device 610A, a message and a dynamic tag associated with the message. The dynamic tag may characterize a target recipient group for the message. For example, the server 600 may receive the message 110 shown in FIG. 1, which includes the "Sales Associates" tag 112, which characterizes to whom the message 110 should be sent. The server 600 may receive a message that is associated with two or more tags, such as, the message 140 associated with two tags 142 and 144, as shown in FIG. 1.

At step 720, the server 600 may determine that the receive dynamic tag is relevant to a data set including characteristic data of a plurality of members. For example, the server 600 may store or have access to a plurality of data sets of different types, such as, directory data, personnel data, schedule data and location data. Upon receiving the message 110 including the "Sales Associates" tag 112, the server 600 may search the data sets for the term "Sales Associate" and may find the term "Sales Associate" in a "Title" data field of the directory data, which indicates that the received tag 112 is relevant to the directory data. When more than one tag is associated with the message, the server 600 may determine the corresponding data set for each tag. For example, when the message 140 (shown in FIG. 1) is received, the server 600 may determine that the "Manager" tag 142 is relevant to the directory data, and the "On-Shift" tag 144 is relevant to the schedule data.

At step 730, the server 600 may, based on the dynamic tag and characteristic data, identify, from the plurality of members, a member group relevant to the dynamic tag. For example, when the message 110 associated with the "Sales Associates" tag 112 is received, the server 600 may search the directory data to identify the members who are characterized as "Sales Associate" in the "Title" data field. When the message 140 associated with the "Manager" tag 142 and "On-Shift" tag 144 is received, the server 600 may search the directory data and schedule data to identify a member group who are characterized as "manager" and another member group who are characterized as currently being on shift, respectively. The server 600 may then select the members who are included in both members groups as the recipient group for the message 140.

Some of the dynamic tags may be associated with a specific time or time period. For example, the "On-Shift" dynamic tag 144 may be associated with a current time at which the message 140 is sent by the user device 610 or the member schedule data set is searched to identify the member group. A "On-Shift at tomorrow 2 PM" tag may be associated with a further time (e.g., tomorrow at 2 PM). A "On-Vacation Next Month" tag may be associated with a period of time (e.g., next month). Some of the member data may also be associated with a time or time period. For example, the member schedule data set may include a member shift attribute (e.g., a member attendance/absence attribute, etc.) that is associated with a time or time period. In the member schedule data set, each member may be associated with one or more parameters for the member shift attribute, such as, a shift team (e.g., morning shift team, afternoon shift team, etc.), shift hours (e.g., 7 AM to 5 PM, 5 PM to 12 AM and 12 AM to 7 AM), shift start hour (e.g., 7 AM, 5 PM and 12 AM), shift end hour (e.g., 5 PM, 12 AM and 7 AM), etc. Hence, even when the same dynamic tag is used, the server 600 may identify a different member group depending on the time and time period associated with the dynamic tag. For example, the same "On-Shift" tag 144 used before and after a shift change may result in two different member groups, respectively.

To identify the member group relevant to the "On-shift" tag 144, the server 600 may access the member schedule data set, and then map the dynamic tag 144 to the member schedule data based on (i) the parameter of the member schedule attribute associated with each member and (ii) the time or time period associated with the "On-Shift" dynamic tag 144, which is the current time at which the message 140 was sent or the dynamic tag 144 was mapped to the member schedule data. By performing the mapping, the server 600 may identify one or more mapped members that form the member group corresponding to the dynamic tag 144. For example, based on the "On Shift" dynamic tag 144 and the shift-related parameter (e.g., the shift hours), the server 600 may identify the members who are on the current shift.

At step 740, the server 600 may send, via the communication network 640, the message to a device group associated with the member group. For example, upon identifying certain members (e.g., Sara Dunn and Babak Shammas in FIG. 1) as being the member group relevant to the message 110, the server 600 may identify contact data (e.g., network IDs, messaging app alias, mobile phone number, etc.) of the members of the recipient group. Then, the server 500 may then send, via the communication network 640, the message 110 using the contact data, to user devices (e.g., PC, smartphone, mobile phone, etc.) associated with the members of the recipient group.

As such, by using a dynamic tag, a message may be sent out even when a message sender does not know the identity or exact contact information of the recipient of the message because the system can take care of the process of identifying the recipients for the message based on the dynamic tag. The system may be operated to connect or subscribe to data sets of different types in a flexible manner, which may allow the sender to use more dynamic tags to characterize the recipient in a more detailed manner. Hence, the system may reduce or eliminate the technical problem that a message sender needs to know the identity or contact information of the message recipients before sending the message.

The automated message recipient identification system may be used for other purposes, for example, public announcement, survey/census, emergency contact, project management, etc. For example, when a fire breaks out, a local or federal government may receive, from cellular service providers, identity and location data of the mobile service subscribers whose current locations are determined to be close to the fire. The government may then send a warning message or alert to those who are near to the fire.

Figure 8:
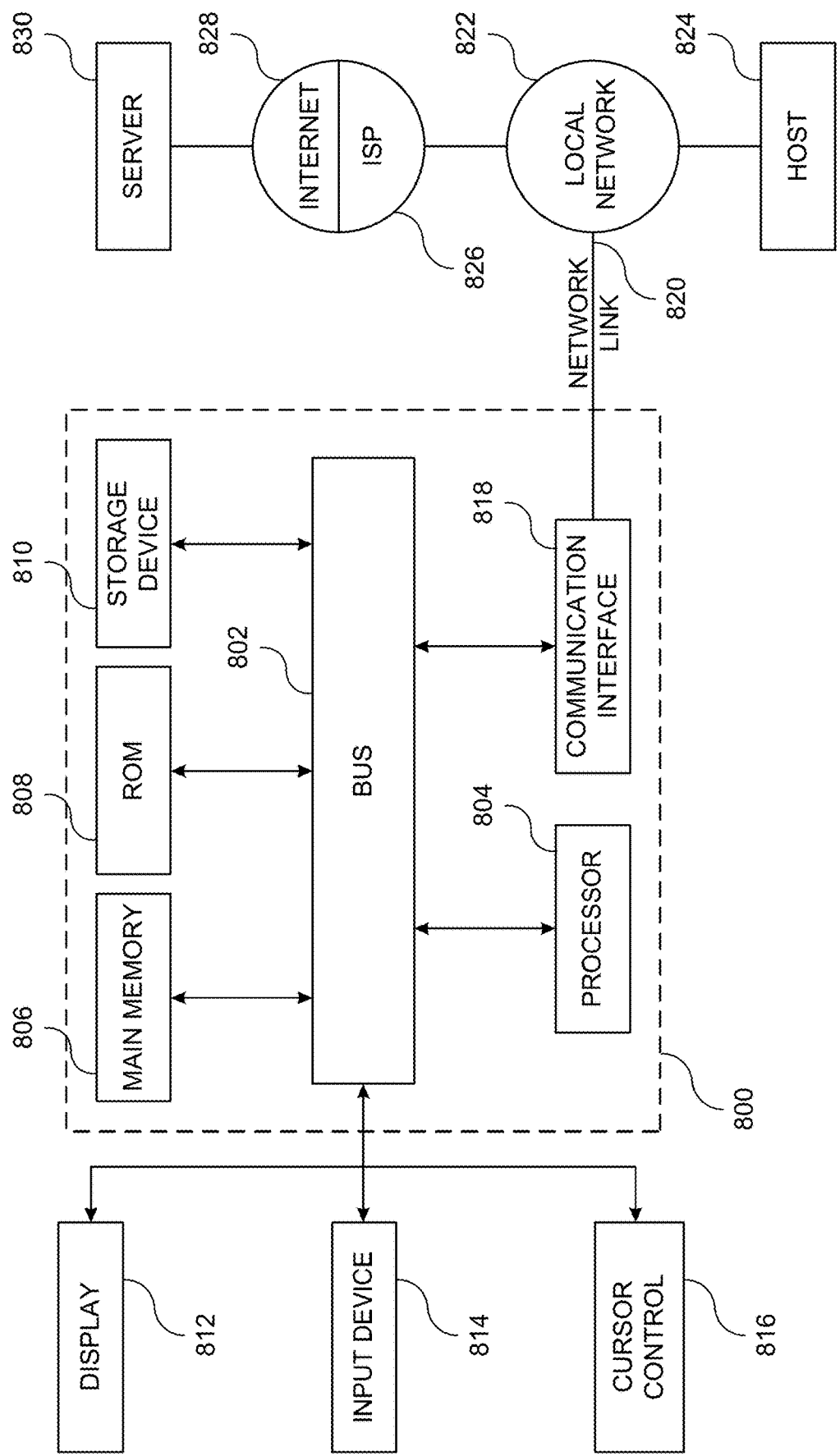
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the system 600, member devices 610 and sources 630.

The computer system 800 may further include a read only memory (ROM) 808 or other non-transitory static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A communication device comprising:
   a processor; and
   a computer-readable medium in communication with the processor, the computer-readable medium comprising executable instructions that, when executed by the processor, cause the processor to control the communication device to perform functions of:
   receiving, via a message user interface of the communication device, a text input composing a message, the text input including a dynamic tag characterizing a recipient group for the message;
   transmitting the text input to a server via a communication network; receiving, from the server via the communication, feedback data indicating that the recipient group for the message has been identified based on the dynamic tag included in the text input;
   in response to receiving the feedback data, providing, via the message user interface, an indication that the recipient group for the message has been identified based on the dynamic tag included in the text input;
   receiving, via the message user interface, a user input requesting to send the message to the identified recipient group; and
   in response to receiving the user input, transmitting, to the server via the communication network, a request to send the message to the identified recipient group.

2. The communication device of claim 1, wherein, for transmitting the text input to the server, the instructions, when execute, for transmitting the text for the message, the instructions, when executed by the processor, further cause the processor to control the communication device to perform transmitting the text input before receiving the user input requesting to send the message.

3. The communication device of claim 2, wherein: for receiving the text input, the instructions, when executed by the processor, further cause the processor to control the communication device to perform:
   receiving, via the message user interface, a first character of the dynamic tag; and
   after receiving the first character, receiving, via the message user interface, a second character of the dynamic tag, and for transmitting the text input to the server, the instructions, when executed by the processor, further cause the processor to control the communication device to perform:
   transmitting, to the server via the communication network, the first character of the dynamic tag: and after transmitting the first character of the dynamic tag, transmitting, to the server via the communication network, the second character of the dynamic tag.

4. The communication device of claim 1, wherein, for providing the indication that the recipient group for the message has been identified, the instructions, when executed by the processor, further cause the processor to control the communication device to perform changing a visual appearance of the dynamic tag displayed on the message user interface.

5. The communication device of claim 4, wherein, for changing the visual appearance of the dynamic tag displayed on the message user interface, the instructions, when executed by the processor, further cause the processor to control the communication device to perform underlining or changing a color of the dynamic tag displayed on the message user interface.

6. The communication device of claim 1, wherein: the dynamic tag comprises first and second dynamic tags characterizing first and second recipient groups, respectively, and the recipient group identified based on the first and second dynamic tags includes one or more recipients associated with both the first and second recipient groups.

7. The communication device of claim 1, wherein: the feedback data includes quantity information of the identified recipient group, and the instructions, when executed by the processor, further cause the processor to control the communication device to perform displaying, via the message user interface, the quantity information of the identified recipient group.

8. The communication device of claim 1, wherein: the feedback data includes a list of candidate recipient groups identified based on the dynamic tag included in the text input, and the instructions, when executed by the processor, further cause the processor to control the communication device to perform: displaying, via the message user interface, the list of candidate recipient groups; receiving a user input selecting one of the candidate recipient groups included in the displayed list; and transmitting, to the server via the communication network, selection data identifying the selected candidate recipient group as the recipient group for the message.

9. A method performed by a communication device, comprising:
   receiving, via a message user interface of the communication device, a text input composing a message, the text input including a dynamic tag characterizing a recipient group for the message;
   transmitting the text input to a server via a communication network; receiving, from the server via the communication, feedback data indicating that the recipient group for the message has been identified based on the dynamic tag included in the text input;
   in response to receiving the feedback data, providing, via the message user interface, an indication that the recipient group for the message has been identified based on the dynamic tag included in the text input;
   receiving, via the message user interface, a user input requesting to send the message to the identified recipient group; and
   in response to receiving the user input, transmitting, to the server via the communication network, a request to send the message to the identified recipient group.

10. The method of claim 9, wherein transmitting the text input to the server comprises transmitting the text input before receiving the user input requesting to send the message.

11. The method of claim 10, wherein: receiving the text input comprises:
   receiving, via the message user interface, a first character of the dynamic tag; and
   after receiving the first character, receiving, via the message user interface, a second character of the dynamic tag, and transmitting the text input to the server comprises:
   transmitting, to the server via the communication network, the first character of the dynamic tag; and
   after transmitting the first character of the dynamic tag, transmitting, to the server via the communication network, the second character of the dynamic tag.

12. The method of claim 9, wherein providing the indication that the recipient group for the message has been identified comprises changing a visual appearance of the dynamic tag displayed on the message user interface.

13. The method of claim 12, wherein changing the visual appearance of the dynamic tag displayed on the message user interface comprises underlining or changing a color of the dynamic tag displayed on the message user interface.

14. The method of claim 9, wherein: the dynamic tag comprises first and second dynamic tags characterizing first and second recipient groups, respectively, and the recipient group identified based on the first and second dynamic tags includes one or more recipients associated with both the first and second recipient groups.

15. The method of claim 9, wherein: the feedback data includes quantity information of the identified recipient group, and the method further comprises displaying, via the message user interface, the quantity information of the identified recipient group.

16. The method of claim 9, wherein: the feedback data includes a list of candidate recipient groups identified based on the dynamic tag included in the text input, and the method further comprises: displaying, via the message user interface, the list of candidate recipient groups; receiving a user input selecting one of the candidate recipient groups included in the displayed list; and transmitting, to the server via the communication network, selection data identifying the selected candidate recipient group as the recipient group for the message.

17. A non-transitory computer-readable medium comprising instructions that, when executed by a processor, cause the processor to control a communication device to perform functions of:
   receiving, via a message user interface of the communication device, a text input composing a message, the text input including a dynamic tag characterizing a recipient group for the message;
   transmitting the text input to a server via a communication network;
   receiving, from the server via the communication, feedback data indicating that the recipient group for the message has been identified based on the dynamic tag included in the text input;
   in response to receiving the feedback data, providing, via the message user interface, an indication that the recipient group for the message has been identified based on the dynamic tag included in the text input;
   receiving, via the message user interface, a user input requesting to send the message to the identified recipient group; and
   in response to receiving the user input, transmitting, to the server via the communication network, a request to send the message to the identified recipient group.

18. The non-transitory computer-readable medium of claim 17, wherein, for transmitting the text input to the server, the instructions, when execute, for transmitting the text for the message, the instructions, when executed by the processor, further cause the processor to control the communication device to perform transmitting the text input before receiving the user input requesting to send the message.

19. The non-transitory computer-readable medium of claim 17, wherein, for providing the indication that the recipient group for the message has been identified, the instructions, when executed by the processor, further cause the processor to control the communication device to perform changing a visual appearance of the dynamic tag displayed on the message user interface.

20. The non-transitory computer-readable medium of claim 19, wherein, for changing the visual appearance of the dynamic tag displayed on the message user interface, the instructions, when executed by the processor, further cause the processor to control the communication device to perform underlining or changing a color of the dynamic tag displayed on the message user interface.

* * * * *